(12) United States Patent
Kosugi et al.

(10) Patent No.: US 11,073,892 B2
(45) Date of Patent: Jul. 27, 2021

(54) PROCESSING CAPACITY AND HEAT MANAGEMENT OF AN INFORMATION PROCESSING DEVICE

(71) Applicant: LENOVO (Singapore) PTE. LTD., New Tech Park (SG)

(72) Inventors: Kazuhiro Kosugi, Yokohama (JP); Takuroh Kamimura, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 130 days.

(21) Appl. No.: 16/429,806

(22) Filed: Jun. 3, 2019

(65) Prior Publication Data
US 2019/0384374 A1 Dec. 19, 2019

(30) Foreign Application Priority Data

Jun. 14, 2018 (JP) .............................. JP2018-113734

(51) Int. Cl.
*G06F 1/3234* (2019.01)
*G06F 1/20* (2006.01)
*G06F 1/3228* (2019.01)

(52) U.S. Cl.
CPC ............ *G06F 1/3243* (2013.01); *G06F 1/206* (2013.01); *G06F 1/3228* (2013.01)

(58) Field of Classification Search
CPC ...... G06F 1/3228; G06F 1/206; G06F 1/3243; G06F 1/1618; G06F 1/203; G06F 1/3206; G06F 1/3234; G06F 9/445
USPC ................................................ 713/300, 320
See application file for complete search history.

(56) References Cited

U.S. PATENT DOCUMENTS

| | | | | |
|---|---|---|---|---|
| 5,931,951 A | * | 8/1999 | Ando .................... | G06F 1/3228 711/141 |
| 6,397,340 B2 | * | 5/2002 | Watts, Jr. ................ | G06F 1/206 713/322 |
| 7,124,300 B1 | * | 10/2006 | Lemke .................... | G06F 21/32 713/186 |
| 2005/0138443 A1 | * | 6/2005 | Cooper ................. | G06F 1/3253 713/300 |
| 2009/0083562 A1 | * | 3/2009 | Park ....................... | G06F 1/162 713/323 |
| 2009/0235108 A1 | | 9/2009 | Gold et al. | |

(Continued)

FOREIGN PATENT DOCUMENTS

CN 107632886 A 1/2018
EP 1734436 A1 12/2006
(Continued)

*Primary Examiner* — Chun Cao
(74) *Attorney, Agent, or Firm* — Kunzler Bean & Adamson

(57) ABSTRACT

An apparatus to switch a central processing unit between operational modes includes, in one embodiment, a central processing unit ("CPU") having at least a first operation mode and a second operation mode, where the second operation mode is a higher performance operation mode than the first operation mode. The apparatus also includes a switching unit that switches a state of the CPU to the second operation mode in response to starting one of an operating system or an application program based on a user operation in a state in which the first operation mode is set, and switches the state of the CPU to the first operation mode in response to a determination that a condition is met.

19 Claims, 5 Drawing Sheets

(56) References Cited

U.S. PATENT DOCUMENTS

| | | | | |
|---|---|---|---|---|
| 2010/0030395 A1* | 2/2010 | Shimotono | ............ | G06F 1/206 |
| | | | | 700/300 |
| 2014/0006765 A1* | 1/2014 | Saito | .................... | G06F 21/572 |
| | | | | 713/2 |
| 2014/0108832 A1* | 4/2014 | Yamaguchi | ........... | G06F 1/1616 |
| | | | | 713/320 |
| 2014/0132340 A1 | 5/2014 | Finch et al. | | |
| 2019/0377393 A1* | 12/2019 | Uchino | ................ | G06F 1/3206 |

FOREIGN PATENT DOCUMENTS

| | | | |
|---|---|---|---|
| JP | 2000222075 | A | 8/2000 |
| JP | 2006059068 | A | 3/2006 |
| JP | 2012048545 | A | 3/2012 |
| JP | 2016540313 | A | 12/2016 |
| JP | 2017033116 | A | 2/2017 |
| WO | 2010/044149 | A1 | 4/2010 |
| WO | 2013/114935 | A1 | 8/2013 |
| WO | 2013179954 | A1 | 12/2013 |

\* cited by examiner

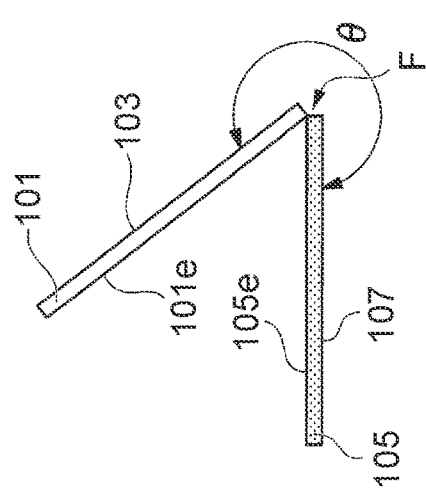
FIG. 2D
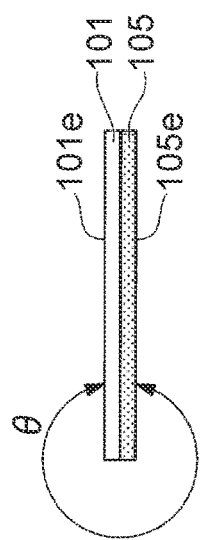
FIG. 2E
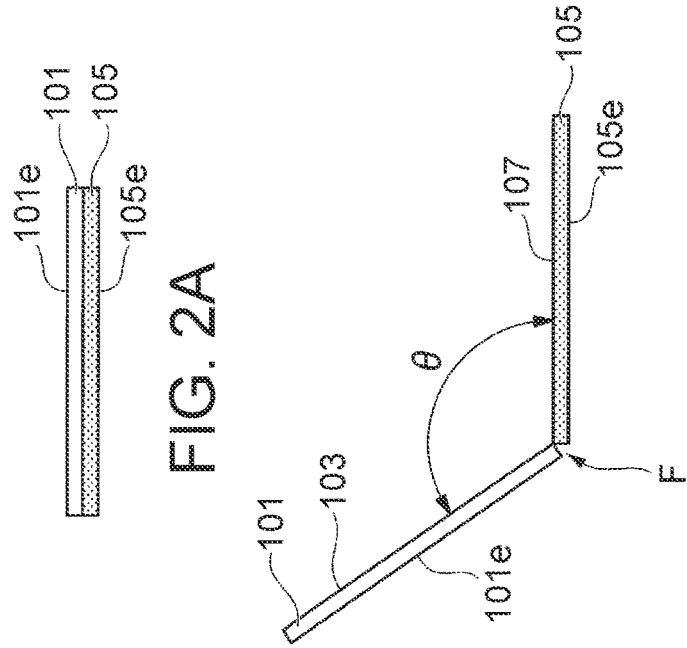
FIG. 2A
FIG. 2B
FIG. 2C

PROCESSING CAPACITY AND HEAT MANAGEMENT OF AN INFORMATION PROCESSING DEVICE

FIELD

The subject matter disclosed herein relates to information processing devices and more particularly relates to an improved processing capacity and heat management of the information processing devices.

BACKGROUND

Information processing devices, such as portable personal computers are required to perform faster processing and also generate less heat during use. When the operation performance of a central processing unit (CPU) in an information processing apparatus is enhanced to achieve faster processing, the power consumption generally increases, and the amount of heat generation increases. In some information processing devices, an operation mode for reducing the amount of heat generation can be set automatically or by user selection. However, when this operation mode is selected in the information processing device, the operation performance of the CPU is reduced to reduce the amount of heat generation. The processing speed also decreases. Thus, the improvement of the processing speed and the reduction of the amount of heat generation are in a tradeoff relationship in the information processing device.

SUMMARY

An apparatus to switch a central processing unit ("CPU") between operating modes is provided. In one embodiment, the apparatus includes the CPU having at least a first operation mode and a second operation mode, where the second operation mode is a higher performance operation mode than the first operation mode. The apparatus also includes a switching unit that switches a state of the CPU to the second operation mode in response to starting one of an operating system or an application program based on a user operation in a state in which the first operation mode is set, and switches the state of the CPU to the first operation mode in response to a determination that a condition is met.

In certain embodiments, the switching unit detects a use form of the apparatus, and to set the state of the CPU to at least one of the first operation mode or the second operation mode in response to the detected use form. The switching unit is further configured to, in response to the detected use form, switch the state of the CPU to the second operation mode, and subsequently in response to the determination that the condition is met, switch the state of the CPU to the first operation mode. In other embodiments, the switching unit is configured to detect the use form distinguished by a shape, as the use form in which the apparatus is used.

In certain embodiments, the switching unit is configured to switch the state of the CPU to the first operation mode in response to a predetermined time having elapsed after setting the state of the CPU to the second operation mode. Additionally, the switching unit is configured to set the predetermined time depending on a type of the application program. The switching unit may also be configured to, in response to a determination that a plurality of application programs are started and a plurality of start processes overlap, switch the state of the CPU from the second operation mode to the first operation mode in response to an application program being started and a determination that a predetermined quantity of time has elapsed.

In certain embodiments, the switching unit is configured to switch the state of the CPU to the first operation mode, in response to the state of the CPU being in the second operation mode and a determination that a use rate of the CPU falls below a predetermined value. The first operation mode is a mode in which a temperature increase of the CPU is less than a temperature increase of the CPU in the second operation mode. In some embodiments, the switching unit is configured to, in response to the CPU being in the second operation mode, reduce or stop a process of a predetermined application program that runs in a background. The switching unit is also configured to determine that starting the application program in the second operation mode is unnecessary in response to learned information, and in response to the determination, start the application program in the first operation mode.

In certain embodiments, the switching unit is also configured to switch the CPU to the second operation mode in response to a determination that a BIOS is starting. Further, the switching unit is configured to, in response to a determination that a file type of the application program is a program execution file, switch the state of the CPU to the second operation mode.

A corresponding method and program product are provided to implement the features of the apparatus. The program product for includes a computer readable storage medium that stores code executable by a processor, the executable code including code to implement the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2A-2E is an explanatory diagram illustrating an example of use modes of the information processing apparatus according to an embodiment of the disclosure;

DETAILED DESCRIPTION

An embodiment of an information processing apparatus will be described below, with reference to drawings.

Figure 1:
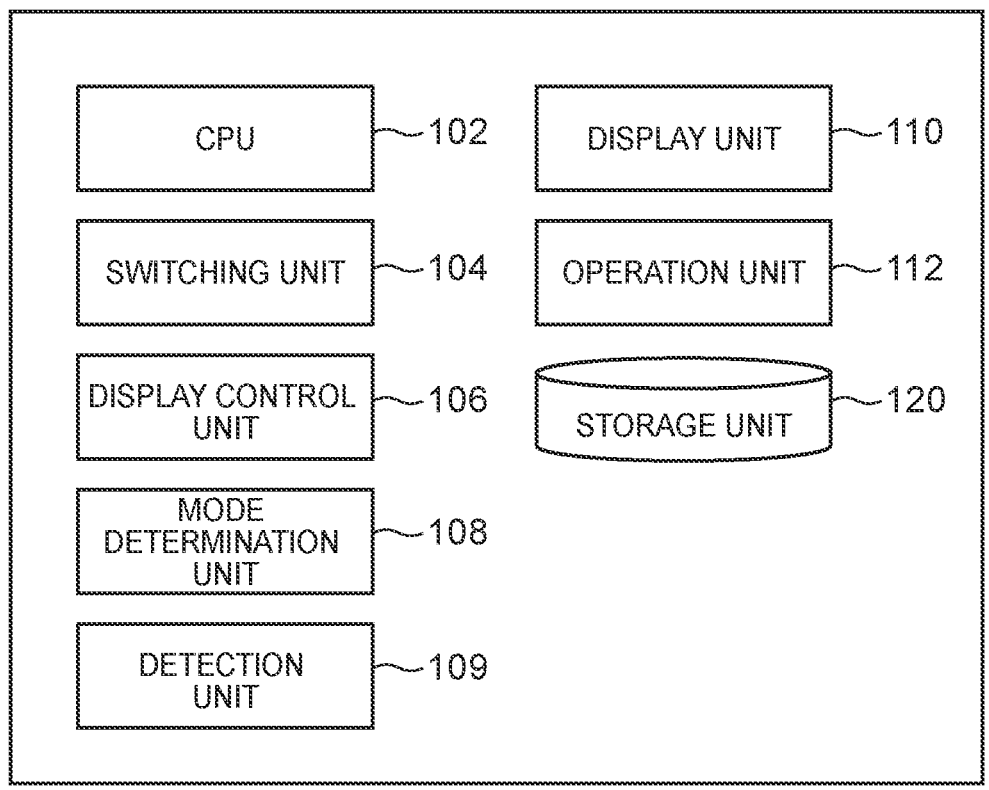
FIG. 1 is a diagram illustrating an example of the structure of an information processing apparatus according to an embodiment of the disclosure.

FIG. 1 is a diagram illustrating an example of the structure of an information processing apparatus 100. The information processing apparatus 100 is a portable mobile apparatus such as a laptop personal computer (PC) or a tablet terminal.

An example in which the information processing apparatus 100 is a laptop PC will be described below. The information processing apparatus 100 includes a first chassis and a second chassis that can be freely opened/closed, and is used in a plurality of shapes depending on the angle between the first chassis and the second chassis. Examples of the shape of the information processing apparatus 100 include tablet mode, laptop mode, tent mode, stand mode, and book mode (for example, see Japanese Unexamined Patent Application Publication No. 2017-033116). For example, the tablet mode is a shape in which the information processing apparatus 100 is used like a tablet terminal in a state of being folded so that the keyboard is at the bottom. The laptop mode is a shape in which the information processing apparatus 100 is used so that input is performed by keyboard operation while viewing a display unit 110.

The tent mode is a shape in which the information processing apparatus 100 is used in a state of being folded in inverted V so that the display surface of the display unit 110 is at the front and placed on a desk or the like. The stand mode is a shape in which the information processing apparatus 100 is used in a state of being inverted so that the display unit 110 faces the user with the keyboard being at the bottom and placed on a desk or the like. Each mode will be described in detail later.

The information processing apparatus 100 includes, for example, a CPU 102, a switching unit 104, a display control unit 106, a mode determination unit 108, a detection unit 109, the display unit 110, an operation unit 112, and a storage unit 120.

The CPU 102 is, for example, a central processing unit that performs central processing in the information processing apparatus 100.

The switching unit 104 performs setting to switch the operation mode of the CPU 102. For example, the switching unit 104 switches the operation mode of the CPU 102 depending on the use form of the information processing apparatus 100. The process by the switching unit 104 will be described in detail later.

The display control unit 106 performs a process of displaying display contents on the screen of the display unit 110 and the like.

The mode determination unit 108 determines the use mode based on a detection value acquired from the detection unit 109. The mode determination unit 108 outputs the use mode determination result to the switching unit 104.

The detection unit 109 includes an accelerometer, and outputs the detection value for determining the shape in the use state of the information processing apparatus 100. The accelerometer detects triaxial acceleration, and is provided in each of the first chassis and the second chassis that are rotatably connected. The detection unit 109 detects the angle between the first chassis and the second chassis and their position, based on detection values of two accelerometers. The detection unit 109 may detect a detection value of any other sensor.

The sensor used in the detection unit 109 is not limited to an accelerometer, and may be, for example, a Hall sensor, an angle sensor, or a gyroscope sensor. For example, the Hall sensor or the angle sensor detects the angle between the first chassis and the second chassis in the information processing apparatus 100. The gyroscope sensor is provided in each of the first chassis and the second chassis and detects the angle and position of the corresponding chassis.

The switching unit 104, the display control unit 106, the mode determination unit 108, and the detection unit 109 are each implemented, for example, by a processor such as a CPU executing a program (software). Each of the functional units may be implemented by hardware such as LSI (Large Scale Integration), ASIC (Application Specific Integrated Circuit), or FPGA (Field-Programmable Gate Array), or implemented by a combination of software and hardware.

The display unit 110 is, for example, a device that is provided in the first chassis 101, includes a display, a speaker, and the like, and transfers information by video, image, text, audio, etc. For example, the display unit 110 is a liquid crystal display or a touchscreen.

The operation unit 112 receives an operation by the user. The operation unit 112 is, for example, provided in the second chassis 105, and includes a keyboard, a mouse, GUI keys of an input screen displayed on the display unit 110, and the like. The operation unit 112 may include a power button.

The storage unit 120 is a nonvolatile storage device storing programs and data. For example, the storage unit 120 is a storage device such as a flash memory or a hard disk drive (HDD).

The use modes of the information processing apparatus 100 will be described below. FIG. 2A-2E is an explanatory diagram illustrating an example of the use modes of the information processing apparatus 100.

For example, the second chassis 105 is rotatable in a predetermined angle range at a bending portion F with respect to the first chassis 101 in the information processing apparatus 100, and the use mode can be switched depending on the angle (hereafter referred to as "open/close angle") between the surface of the first chassis 101 and the surface of the second chassis 105. The bending portion F includes, for example, a hinge mechanism that rotatably connects the first chassis 101 and the second chassis 105.

The use mode is set based on the open/close angle. For example, based on the detection values of the two accelerometers in the detection unit 109, the mode determination unit 108 calculates the relative angle formed by the two accelerometers. The mode determination unit 108 determines the calculated relative angle as the open/close angle. The mode determination unit 108 then determines the use mode based on the open/close angle.

FIG. 2A illustrates closed mode. In the closed mode, the open/close angle θ is 0° as an example. In the case where the open/close angle θ is 0° based on the detection result of the detection unit 109, the mode determination unit 108 determines the use mode of the information processing apparatus 100 as the closed mode.

FIG. 2B illustrates laptop mode. In the laptop mode, the open/close angle θ is 0°<θ<190° as an example. In the case where the open/close angle θ is 0°<θ<190° based on the detection result of the detection unit 109, the mode determination unit 108 determines the use mode of the information processing apparatus 100 as the laptop mode.

FIG. 2C illustrates tent mode. FIG. 2D illustrates stand mode. In each of the tent mode and the stand mode, the open/close angle θ is 190°≤θ<360° as an example. The vertical direction of the first chassis 101 is different between the tent mode and the stand mode. Accordingly, the mode determination unit 108 calculates not only the open/close angle but also the installation position of the information processing apparatus 100, based on the detection result of the detection unit 109. In detail, based on the detection result of the detection unit 109, the mode determination unit 108 determines such a use mode in which the open/close angle θ is 190°≤θ<360° and the information processing apparatus 100 is placed on the installation surface so that the bending portion F is separate from the installation surface upward, as the tent mode.

Moreover, based on the detection result of the detection unit 109, the mode determination unit 108 determines such a use mode in which the open/close angle θ is 190°≤θ<360° and the information processing apparatus 100 is placed so that the bending portion F is approximately in contact with the installation surface, as the stand mode.

FIG. 2E illustrates tablet mode. In the tablet mode, for example, the first chassis 101 and the second chassis 105 folded as illustrated in FIG. 2A are opened and folded back so that the back surface 101e of the first chassis 101 and the back surface 105e of the second chassis 105 face each other. The open/close angle θ is 360° as an example. In the case where the open/close angle θ is 360° based on the detection result of the detection unit 109, the mode determination unit 108 determines the use mode of the information processing apparatus 100 as the tablet mode.

For example, the mode determination unit 108 determines the tablet mode as a first use form in which the information processing apparatus 100 operates in the first operation mode. For example, the mode determination unit 108 determines each mode other than the tablet mode as a second use form in which the information processing apparatus 100 operates in the second operation mode. In the determination process by the mode determination unit 108 described above, the boundary conditions for the open/close angle θ may have adjustment ranges to some extent. By allowing for such adjustment ranges, even in the case where the open/close angle θ varies frequently around a boundary between angle ranges, the use mode corresponding to the angle range is prevented from being changed with the variation.

Processes executed in each component will be described below.

The CPU 102 is capable of, for example, operating in a plurality of operation modes that differ in maximum power consumption. The CPU 102 is also capable of, for example, operating in a plurality of operation modes depending on the cooling state of the CPU 102 such as the rotation frequency of a fan for cooling the CPU 102. For example, the CPU 102 is capable of operating in any of the first operation mode and the second operation mode higher in operation performance than the first operation mode. The number of operation modes is not limited to two and may be three or more.

Figure 3:
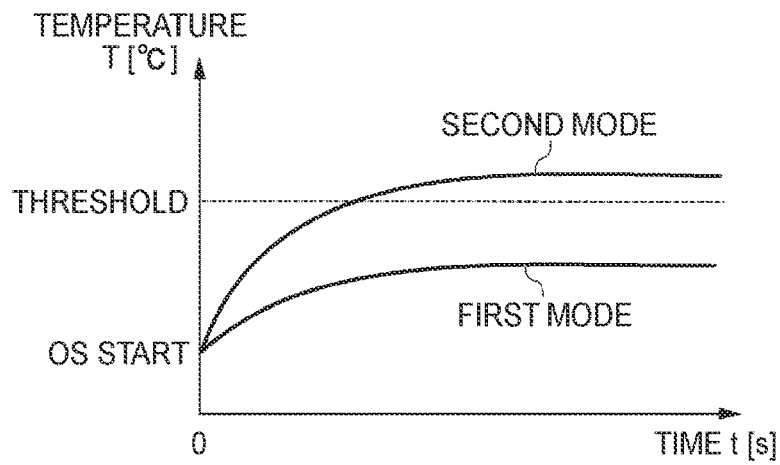
FIG. 3 is a diagram schematically illustrating the relationships between a first operation mode and a second operation mode and temporal changes in temperature according to an embodiment of the disclosure.

FIG. 3 is a diagram schematically illustrating the relationships between the first operation mode and the second operation mode and the temporal changes in temperature. In the drawing, the vertical axis represents the temperature, and the horizontal axis represents the time.

The first operation mode is a mode in which the operation performance of the CPU 102 is reduced as compared with the second operation mode to reduce the power consumption and reduce the temperature increase. For example, the CPU 102 changes the operation performance by changing the operation frequency. As illustrated in FIG. 3, in the case where the CPU 102 is in the state of the first operation mode, the temperature increase is reduced, and the temperature of the chassis of the information processing apparatus 100 is kept at a predetermined value (a threshold set for the first operation mode) or less. In the case where the CPU 102 is in the state of the first operation mode, the power consumption is reduced as compared with the second operation mode.

In the first operation mode, the user senses less heat generation of the chassis of the information processing apparatus 100 than in the second operation mode. In view of this, the first operation mode may be preferable in the case where the user often operates the information processing apparatus 100 while holding it by the hand as in the tablet mode. However, if the information processing apparatus 100 is used while the CPU 102 is in the state of the first operation mode, the user is likely to feel that a boot process of an operating system (OS) or a start process of an application program is slow.

In the boot process of the OS or the start process of the application program, the operation load of the CPU can increase temporarily. However, since CPU operation is reduced in the first operation mode, operation capacity for promptly completing the start process or the like is insufficient. In particular, in the case where the information processing apparatus 100 automatically sets the first operation mode depending on the use form regardless of the user's direct intention or instruction, the user is likely to feel that the operation of the information processing apparatus is not comfortable.

If the CPU 102 performs processing in the state of the second operation mode, the processing speed increases and the time required to boot the OS, or the time required to start the application program is shortened as compared with the first operation mode. In the case where the CPU 102 is in the state of the second operation mode, however, the power consumption increases as compared with the first operation mode, so that the temperature increases with the use time.

As illustrated in FIG. 3, when the CPU 102 is in the state of the second operation mode, the temperature of the chassis of the information processing apparatus 100 may exceed the threshold. In a situation in which the user is in contact with the chassis such as when the user operates the information processing apparatus 100 while holding the chassis of the information processing apparatus 100 by the hand, there is a possibility that the user senses heat generation of the chassis of the information processing apparatus 100.

Figure 4:
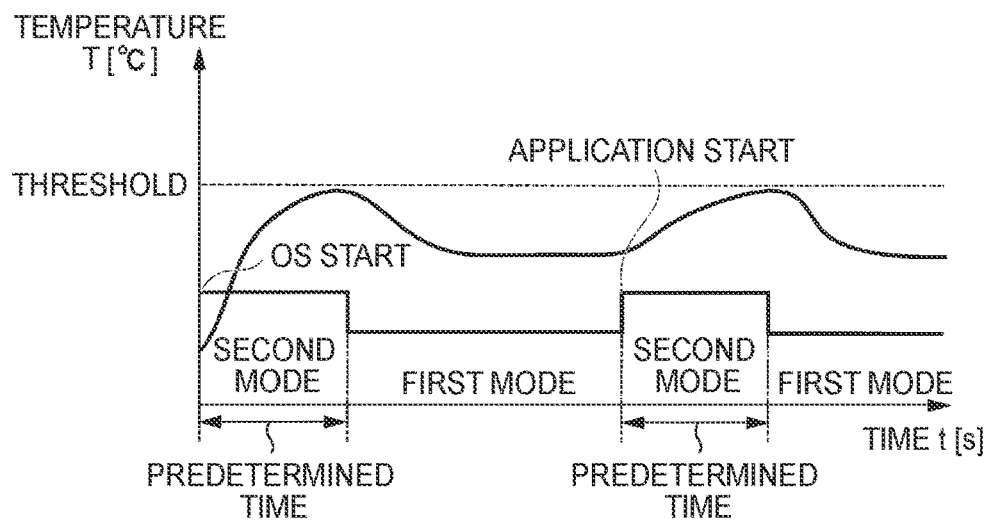
FIG. 4 is a diagram illustrating an example of the relationship between the switching of the operation mode of the CPU and the temperature increase according to an embodiment of the disclosure.

FIG. 4 is a diagram illustrating an example of the relationship between the switching of the operation mode of the CPU 102 and the temperature increase. In the drawing, the vertical axis represents the temperature, and the horizontal axis represents the time. To reduce heat generation of the chassis of the information processing apparatus 100, the switching unit 104 switches the operation mode of the CPU 102. For example, in a state in which the CPU 102 is set to the first operation mode depending on the use form of the information processing apparatus 100, in the case where the operation performance of the CPU 102 is required, the switching unit 104 switches the operation mode of the CPU 102 to the second operation mode, to set a higher temperature threshold. In other cases, the switching unit 104 sets the first operation mode corresponding to the use form of the information processing apparatus 100.

The switching unit 104 switches the operation mode of the CPU 102 depending on the user form in which the information processing apparatus 100 is used. For example, based on the result of the mode determination unit 108 determining the use form, which is distinguished by the shape, based on the detection value of the detection unit 109, the switching unit 104 detects the tablet mode, and sets the state of the CPU 102 to the first operation mode. In the tablet mode, the user is likely to often operate the information processing apparatus 100 while holding it by the hand, and therefore the temperature increase of the information processing apparatus 100 is desirably reduced.

For example, based on the result of the mode determination unit 108 determining the use form, which is distinguished by the shape, based on the detection value of the detection unit 109, the switching unit 104 detects the laptop mode, the tent mode, and the stand mode, and sets the state of the CPU 102 to the second operation mode. In these operation modes, the information processing apparatus 100 is placed on a desk or the like and the possibility that the user's body comes into contact with the chassis and the user senses heat generation of the chassis is low, and therefore increasing the operation performance of the CPU 102 is desirable for the user.

The switching unit 104 may set the operation mode of the CPU 102 to the first operation mode or the second operation mode, in response to an instruction made by a selection operation by the user.

In a state in which the operation mode of the CPU 102 is set in the first operation mode depending on the use form in which the information processing apparatus 100 is used or based on a selection operation by the user, the switching unit 104 sets the operation mode of the CPU 102 to the second operation mode when starting the OS or when starting the application program based on an operation by the user, and then switches the operation mode of the CPU 102 to the first operation mode when a predetermined condition is met, e.g. when a predetermined quantity of time has elapsed.

For example, during start of booting of the OS as a result of the information processing apparatus 100 being turned on according to an operation by the user, the switching unit 104 sets the operation mode of the CPU 102 from the first operation mode to the second operation mode, triggered by the start of the BIOS (Basic Input/output System). This operation is performed both in the case where the first operation mode is set in response to an instruction made by a selection operation by the user and in the case where the first operation mode is set depending on the use form. Alternatively, this process may be omitted in the case where the first operation mode is set in response to an instruction made by a selection operation by the user. For example, the switching unit 104 sets the state of the CPU 102 to the second operation mode in CPU operation factor setting item "CPU Ratio Control" in setup items upon BIOS start when the clock chip stops a reset signal to the CPU 102 and initialization of the CPU 102 is started.

The switching unit 104 may set an FSB clock speed in "FSB Frequency" which is an operation frequency setting item for the CPU 102, to specifically set the operation frequency of the CPU 102 to the value of the second operation mode. For example, the switching unit 104 may set the state of the CPU 102 to the second operation mode by a start-up program that starts after loading by the BIOS.

Moreover, when starting the application program according to an operation by the user in a process after booting the OS, the switching unit 104 sets the operation mode of the CPU 102 from the first operation mode to the second operation mode, triggered by a start instruction based on the operation received by the operation unit 112. For example, the switching unit 104 sets the operation mode of the CPU 102 in the start process of the application program.

The start process of the application program (e.g. file name "AAA.exe") based on an operation by the user is typically performed as follows. (1): The user performs an operation such as double click or tap on the file "AAA.exe". (2): Based on the operation in (1), the OS determines the file type of the selected, e.g. clicked, "AAA.exe" based on the extension, and determines whether or not "AAA.exe" is a program execution file. (3): In the case where the file is determined as a program execution file based on the extension in (2), the OS loads program data (=program code) of "AAA.exe" onto main memory (RAM: Random Access Memory) and executes it as the application program. (4): The CPU 102 sequentially processes the program codes of "AAA.exe" loaded onto the main memory.

For example, in the case where a signal corresponding to the operation by the user for the operation object is detected as a start instruction and the file which is the object of operation by the user is determined as a program execution file in (2), the switching unit 104 switches the operation mode of the CPU 102 from the first operation mode to the second operation mode. Alternatively, the switching unit 104 may monitor the main memory and, in the case of determining that the OS has loaded the program codes onto the main memory, switch the operation mode of the CPU 102 from the first operation mode to the second operation mode. By such a process, the information processing apparatus 100 can improve comfort when the application program is started according to the user's intension.

For example, the switching unit 104 switches the operation mode of the CPU 102 from the second operation mode to the first operation mode, when a predetermined time has elapsed after setting the operation mode of the CPU 102 to the second operation mode. The predetermined time is set to, for example, about several tens of seconds. The predetermined time is set beforehand so that the temperature value of the chassis increased due to the processing of the CPU in the state of the second operation mode decreases to a predetermined threshold or less and stored in the storage unit. The predetermined time stored in the storage unit may assume a different value between when starting the OS and when starting the application program. In the case of detecting the start of the OS, the switching unit 104 switches the operation mode of the CPU 102 from the second operation mode to the first operation mode after a predetermined time set beforehand for use when starting the OS.

In the case of detecting the start of a predetermined application program, the switching unit 104 switches the operation mode of the CPU 102 from the second operation mode to the first operation mode after a predetermined time set beforehand for use when starting the predetermined application program. The predetermined time may be set beforehand depending on the type of the application program executed (started) and stored in the storage unit. The predetermined time set according to an operation by the user may be stored in the storage unit.

For example, in the case where a plurality of application programs are started and a plurality of start processes overlap, the switching unit 104 switches the operation mode of the CPU 102 from the second operation mode to the first operation mode when the predetermined time has elapsed after starting the application program started last.

The information processing apparatus 100 may reduce or stop a process of a predetermined application program that runs in the background, while the switching unit 104 temporarily sets the operation mode of the CPU 102 to the second operation mode when starting an application program based on an operation by the user. Examples of the predetermined application program that runs in the background include an update program that runs regardless of operation by the user and a security measure program for the information processing apparatus 100 against viruses and the like.

For example, from among the application programs that run in the background, the switching unit 104 stops each application program that can be stopped and reduces each application program necessary for security measures to such an extent that minimum processing is performed. By such a process, the information processing apparatus 100 can shorten the processing time in the second operation mode.

Figure 5:
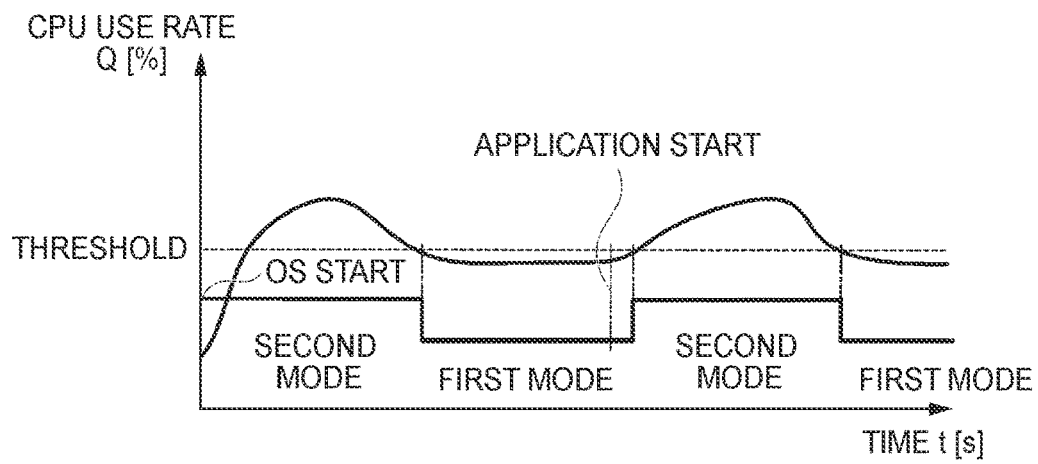
FIG. 5 is a diagram illustrating the relationship between the CPU use rate and the time in the case where the first operation mode is set in a tablet mode or in the case where the first operation mode is set by the user according to an embodiment of the disclosure.

In the foregoing example, the operation mode of the CPU 102 is switched from the second operation mode to the first operation mode when the predetermined time has elapsed after setting the operation mode of the CPU 102 to the second operation mode. However, the present invention is not limited to this. As illustrated in FIG. 5, the operation mode of the CPU 102 may be switched from the second operation mode to the first operation mode based on a condition other than elapsing of the predetermined time.

FIG. 5 is a diagram illustrating the relationship between the CPU use rate and the time in the case where the first operation mode is set in the tablet mode or in the case where the first operation mode is set by the user. In the FIG. 5, the vertical axis represents the CPU use rate, and the horizontal axis represents the time. When starting the OS, the switching unit 104 starts processing in the second operation mode. Subsequently, the switching unit 104 monitors the use rate of the CPU 102 and determines whether or not the CPU use rate is less than a predetermined value. In the case of determining that the use rate is less than the predetermined value, the switching unit 104 switches the operation mode back to the first operation mode. The use rate of the CPU 102 is a proportion in which the programs executed in the information processing apparatus 100 occupy the processing time of the CPU 102.

Moreover, after the CPU 102 starts processing in the first operation mode following the start of an application program, the switching unit 104 may determine whether or not switching to the second operation mode is necessary, and switch to the second operation mode in the case of determining that the switching is necessary. For example, when determining the need to switch to the second operation mode, the switching unit 104 may determine whether or not the use rate of the CPU 102 is a predetermined value or more, and set the second operation mode in the case of determining that the use rate is the predetermined value or more.

For example, when determining the need to switch to the second operation mode, the switching unit 104 may determine the type of the application program and set the second operation mode in the case of determining that the application program is an application program used in the second operation mode. After the CPU 102 starts processing in the first operation mode following the start of an application program, the switching unit 104 maintains the setting of the CPU 102 at the first operation mode in the case of determining that switching to the second operation mode is unnecessary.

By such a process, the information processing apparatus 100 switches the operation mode to the second operation mode on condition that a situation in which the load of the CPU 102 increases arises, e.g. high-quality video reproduction or 3D model rendering. This can facilitate the start of the application program.

The switching unit 104 may, for example, switch the operation mode of the CPU 102 based on learning. For example, the switching unit 104 monitors and learns the use rate of the CPU 102 when starting each type of application program, and stores, for each application program, information of whether the use rate of the CPU 102 when starting the application program is less than the predetermined value or is the predetermined value or more, in the storage unit.

When starting each application program, the switching unit 104 determines whether or not the application program corresponds to the use rate of the CPU 102 of less than the predetermined value, based on the stored information. When starting an application program corresponding to the use rate of the CPU 102 of less than the predetermined value, the switching unit 104 determines that it is not necessary to set the second operation mode, and starts the application program in the first operation mode without switching the state of the CPU to the second operation mode. By such a process using the learning results, the information processing apparatus 100 can prevent the operation mode of the CPU 102 from being changed unnecessarily when starting a newly installed application program.

In the case of switching to the second operation mode upon start of an application program based on an operation by the user when the first operation mode is set in response to an instruction made by a selection operation by the user or the first operation mode is set depending on the use form, the display control unit 106 may cause the display unit 110 to display a display image indicating that the operation mode is temporarily changed to the second operation mode. By such a process, the user can be kept from unexpectedly feeling heat generation of the chassis uncomfortable when the user's body is in contact with the chassis of the information processing apparatus 100.

The display control unit 106 causes the display unit 110 to display the display contents according to an instruction by the CPU 102. Displaying the display contents on the display unit 110 includes not only displaying text, image, and video singly or in combination of one or more, but also reproducing audio.

For example, the display control unit 106 causes the display unit 110 to display the display contents of an application program started based on an operation by the user and used. The display control unit 106 causes the display unit 110 to display, for example, a start image indicating the name of the application program and the like until the start process of the application program ends. After the start process ends, the display control unit 106 causes the display unit 110 to display the contents of the application program.

Figure 6:
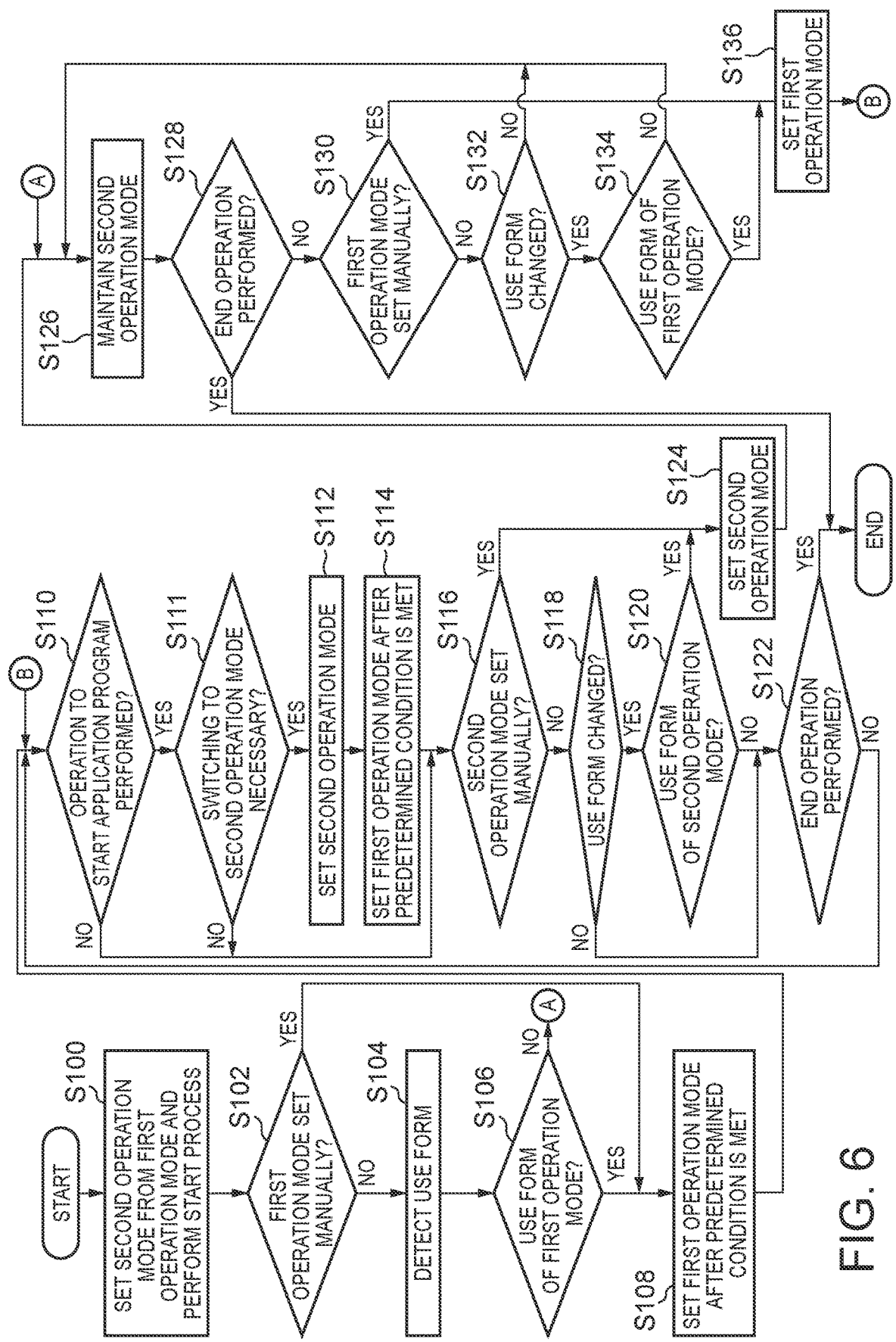
FIG. 6 is a flowchart illustrating an example of processes executed in the information processing apparatus according to an embodiment of the disclosure.

Processes executed in the information processing apparatus 100 will be described below. FIG. 6 is a flowchart illustrating an example of the processes executed in the information processing apparatus 100.

In the information processing apparatus 100, even in the case where, in the previous operation, the CPU 102 is manually set to operate in the first operation mode or the information processing apparatus 100 is in the use form with which the first operation mode is automatically set, the CPU 102 starts in the second operation mode when the information processing apparatus 100 is started.

In the case where the information processing apparatus 100 is turned on as a result of the operation unit 112 receiving an operation, the switching unit 104 sets the state of the CPU 102 from the first operation mode to the second operation mode, and the CPU 102 performs the start process of the OS in the second operation mode (step S100).

The switching unit 104 determines whether or not the CPU 102 is manually set to the first operation mode (step S102). In the case where the determination is affirmative in step S102, the process advances to step S108. In the case where the determination is negative in step S102, the switching unit 104 detects the use form of the information processing apparatus 100 based on the determination result of the mode determination unit 108 (step S104).

The switching unit 104 detects whether or not the use form of the information processing apparatus 100 is the use form of the first operation mode, based on the use form detection result (step S106). In the case where the switching unit 104 detects that the use form of the information processing apparatus 100 is other than the tablet mode used in the first operation mode in step S106, the process advances to step S126.

In the case where the switching unit 104 detects that the use form of the information processing apparatus 100 is the tablet mode used in the first operation mode in step S106, the switching unit 104 sets the setting of the CPU 102 to the first operation mode when a predetermined condition is met, e.g. a predetermined time has elapsed from the start of the OS or the use rate of the CPU 102 falls below a threshold (step S108).

The switching unit 104 determines whether or not an operation of starting an application program is performed based on an operation by the user (step S110). In the case where the determination is negative in step S110, the process advances to step S116. In the case where the determination is affirmative in step S110, the switching unit 104 determines whether or not the setting of the CPU 102 needs to be switched to the second operation mode based on the use rate of the CPU 102, the type of the application program, and the need of change (step S111). In the case where the determination is affirmative in step S111, the switching unit 104 switches the setting of the CPU 102 from the first operation mode to the second operation mode (step S112). In the case where the determination is negative in step S111, the process advances to step S116.

The switching unit 104 sets the setting of the CPU 102 to the first operation mode when a predetermined condition is met, e.g. a predetermined time has elapsed from the start of the application program or the use rate of the CPU 102 falls below a threshold (step S114). The switching unit 104 determines whether or not the setting of the CPU 102 is manually switched from the first operation mode to the second operation mode (step S116).

In the case where the determination is affirmative in step S116, the process advances to step S124. In the case where the determination is negative in step S116, the switching unit 104 detects whether or not the use form of the information processing apparatus 100 is changed (step S118).

In the case of detecting that the use form of the information processing apparatus 100 is changed in step S118, the switching unit 104 detects whether or not the use form of the information processing apparatus 100 is the use form of the second operation mode based on the use form detection result (step S120).

In the case where the use form of the information processing apparatus 100 is not the use form used in the second operation mode but the tablet mode used in the first operation mode in step S120, the switching unit 104 determines whether or not an operation to end the information processing apparatus 100 is performed based on an operation by the user (step S122).

In the case where the determination is affirmative in step S122, the process in the flowchart ends. In the case where the determination is negative in step S122, the process returns to step S110.

In the case of detecting that the use form of the information processing apparatus 100 is a use form other than the tablet mode used in the first operation mode in step S120, the switching unit 104 switches the setting of the CPU 102 from the first operation mode to the second operation mode (step S124).

The switching unit 104 maintains the setting of the CPU 102 at the second operation mode (step S126). The switching unit 104 determines whether or not an operation to end the information processing apparatus 100 is performed based on an operation by the user (step S128). In the case where the determination is affirmative in step S128, the process in the flowchart ends.

In the case where the determination is negative in step S128, the switching unit 104 determines whether or not the setting of the CPU 102 is manually switched from the second operation mode to the first operation mode (step S130).

In the case where the determination is affirmative in step S128, the process advances to step S136. In the case where the determination is negative in step S128, the switching unit 104 detects whether or not the use form of the information processing apparatus 100 is changed (step S132). In the case where the determination is negative in step S132, the process returns to step S126. In the case where the determination is affirmative in step S132, the switching unit 104 detects whether or not the use form of the information processing apparatus 100 is the use form of the first operation mode based on the use form detection result (step S134).

In the case where the switching unit 104 detects that the use form of the information processing apparatus 100 is a use form other than the tablet mode used in the first operation mode in step S134, the process returns to step S126.

In the case where the switching unit 104 detects that the use form of the information processing apparatus 100 is the tablet mode used in the first operation mode in step S134, the switching unit 104 switches the setting of the CPU 102 from the second operation mode to the first operation mode (step S136). The process then returns to step S110.

As a result of the process in the flowchart described above, the information processing apparatus 100 can change the setting of the CPU 102 as appropriate. The steps in the flowchart may be subjected to addition of other step(s), omission, and replacement as appropriate.

As described above, according to this embodiment, even in the case where the information processing apparatus 100 is set in the first operation mode according to the use form or setting by the user, the information processing apparatus 100 operates in the second operation mode higher in operation performance than the first operation mode for a temporary period of time from when the OS starts or when an application program starts based on a user operation to when a predetermined condition is met. This maintains comfort for the user regarding the operation and temperature of the information processing apparatus 100. Moreover, in the case where an application program is newly installed, the information processing apparatus 100 can determine whether to change the operation mode of the CPU based on learning.

Figure 7:
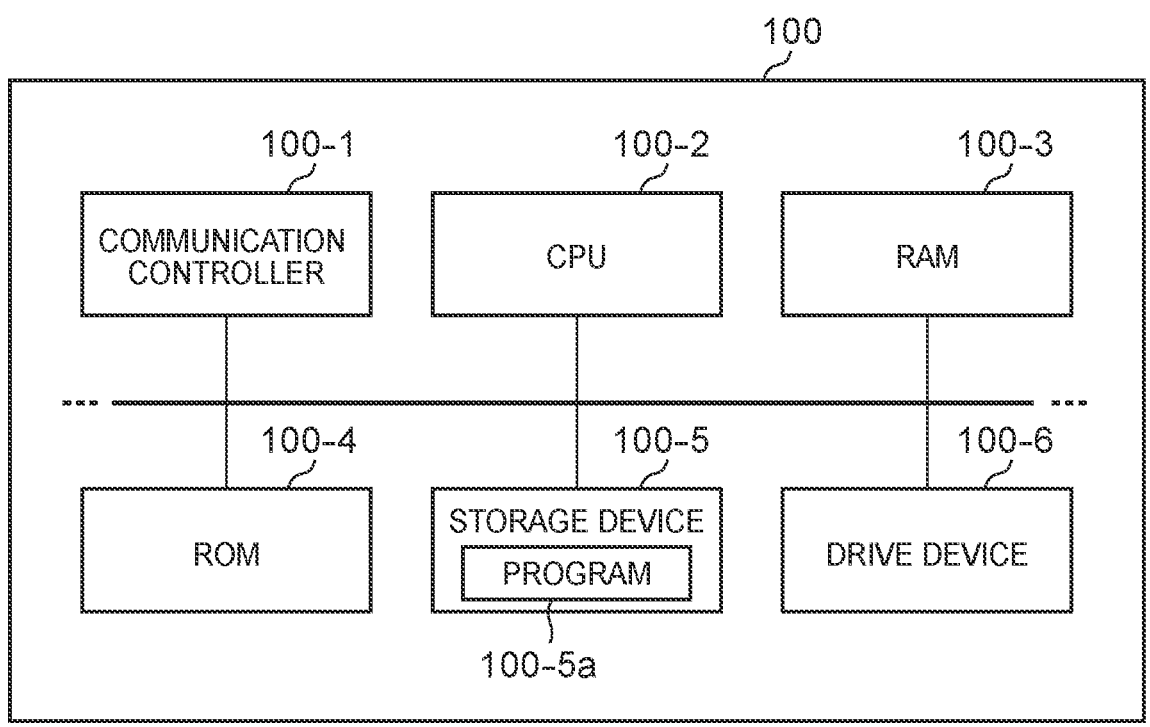
FIG. 7 is a diagram illustrating an example of the hardware structure of the information processing apparatus according to an embodiment of the disclosure.

FIG. 7 is a diagram illustrating an example of the hardware structure of the information processing apparatus 100. As illustrated in the drawing, the information processing apparatus 100 according to this embodiment is formed by connecting, via internal buses or dedicated communication lines, a communication controller 100-1, a CPU 100-2, a RAM 100-3 used as working memory, a ROM (Read Only Memory) 100-4 storing a boot program and the like, a storage device 100-5 such as a flash memory or an HDD, a drive device 100-6, and so on. The communication controller 100-1 communicates with components other than the information processing apparatus 100. The storage device 100-5 stores a program 100-5a executed by the CPU 100-2. This program is expanded on the RAM 100-3 by a direct memory access (DMA) controller (not illustrated) or the like and executed by the CPU 100-2. All or part of the operation unit, the determination unit, and the display control unit are thus implemented.

While the mode for carrying out the present invention has been described above by way of an embodiment, the present invention is not limited to such an embodiment, and various modifications and substitutions can be made without departing from the scope of the present invention.

For example, the foregoing embodiment describes an example in which the use form of the information processing apparatus 100 distinguished by the shape is detected and the operation of the CPU 102 is switched between the first operation mode and the second operation mode, and, even in the case where the operation of the CPU 102 is set in the first operation mode by this function, the information processing apparatus 100 operates in the second operation mode for a temporary period of time from when the OS starts or when an application program starts based on a user operation to when a predetermined condition is met. Alternatively, the use form other than shape may be detected to switch the operation of the CPU 102 between the first operation mode and the second operation mode.

As an example, the use form may be distinguished by the surrounding environment (ambient noise). In this case, for example, the detection unit 109 detects a signal of the level of ambient noise input through a microphone included in the information processing apparatus 100. The switching unit 104 determines whether or not the noise level exceeds a reference level based on the detection result and, based on the determination result, sets the second operation mode in a use form of a high noise level environment and sets the first operation mode in a use form of a low noise level environment.

As another example, the use form may be distinguished by the use location of the information processing apparatus 100. In this case, for example, the detection unit 109 acquires position information of the use location using a position detection function of a GPS device or the like included in the information processing apparatus 100. Based on the position information acquired by the detection unit 109, the switching unit 104 sets the second operation mode in a specific location and sets the first operation mode in other locations.

As another example, the use form may be distinguished by the use time frame of the information processing apparatus 100. In this case, for example, the switching unit 104 sets the second operation mode in a time frame of daytime and sets the first operation mode in a time frame of late at night or early in the morning.

As another example, the use form may be distinguished by the type of power source to which the information processing apparatus 100 is connected. In this case, for example, the detection unit 109 acquires information of whether the information processing apparatus 100 is connected to an AC adapter power source or only connected to a DC power source. Based on the information acquired by the detection unit 109, the switching unit 104 sets the second operation mode in the case where an AC adapter power source is connected and sets the first operation mode in the case where only a DC power source is connected.

Although the above describes the case where the CPU is set to operate in the first operation mode in the tablet mode, a low noise level environment, a location other than the specific location, a time frame of late at night or early in the morning, or in the case where only a DC power source is connected and otherwise set to operate in the second operation mode, the present invention is not limited to such. For example, the present invention is equally applicable in the case where the CPU operates in another operation mode lower in operation performance than the first operation mode in the tablet mode or the like and otherwise operates in the first operation mode, as in the foregoing embodiment.

In such a case, for example, even in the case where the first operation mode is set in the laptop mode or the like, the CPU operates in the second operation mode higher in operation performance than the first operation mode for a temporary period of time from when the OS starts or when an application program starts based on a user operation to when a predetermined condition is met.

Although one embodiment of the present disclosure is described in detail with reference to the drawings as above, the specific configurations are not limited to the above-described configurations and various design changes, alterations and so forth are possible within a range not deviating from the gist of the present invention.

What is claimed is:

1. An apparatus comprising:
a central processing unit ("CPU") having at least a first operation mode and a second operation mode, where the second operation mode is a higher performance operation mode than the first operation mode; and
a switching unit that switches a state of the CPU to the second operation mode in response to starting one of an operating system or an application program based on a user operation in a state in which the first operation mode is set, switches the state of the CPU to the first operation mode in response to a determination that a condition is met, and wherein the switching unit, in response to the CPU being in the second operation mode, reduces or stops a process of a predetermined application program that runs in a background.

2. The apparatus of claim 1, wherein the switching unit is further configured to detect a use form of the apparatus, and to set the state of the CPU to at least one of the first operation mode or the second operation mode in response to the detected use form.

3. The apparatus of claim 2, wherein the switching unit is further configured to, in response to the detected use form, switch the state of the CPU to the second operation mode, and subsequently in response to the determination that the condition is met, switch the state of the CPU to the first operation mode.

4. The apparatus of claim 3, wherein the switching unit is configured to detect the use form distinguished by a shape, as the use form in which the apparatus is used.

5. The apparatus of claim 1, wherein the switching unit is configured to switch the state of the CPU to the first operation mode in response to a predetermined time having elapsed after setting the state of the CPU to the second operation mode.

6. The apparatus of claim 5, wherein the switching unit is configured to set the predetermined time depending on a type of the application program.

7. The apparatus of claim 5, wherein the switching unit is further configured to, in response to a determination that a plurality of application programs are started and a plurality of start processes overlap, switch the state of the CPU from the second operation mode to the first operation mode in response to an application program being started and a determination that a predetermined quantity of time has elapsed.

8. The apparatus of claim 1, wherein the switching unit is configured to switch the state of the CPU to the first operation mode, in response to the state of the CPU being in the second operation mode and a determination that a use rate of the CPU falls below a predetermined value.

9. The apparatus of claim 1, wherein the first operation mode is a mode in which a temperature increase of the CPU is less than a temperature increase of the CPU in the second operation mode.

10. The apparatus of claim 1, wherein the switching unit is configured to determine that starting the application program in the second operation mode is unnecessary in response to learned information, and in response to the determination, start the application program in the first operation mode.

11. The apparatus of claim 1, wherein the switching unit is configured to switch the CPU to the second operation mode in response to a determination that a BIOS is starting.

12. The apparatus of claim 1, wherein the switching unit is configured to, in response to a determination that a file type of the application program is a program execution file, switch the state of the CPU to the second operation mode.

13. A method comprising:
operating a central processing unit ("CPU") in one of at least a first operation mode and a second operation mode, where the second operation mode is a higher performance operation mode than the first operation mode;
switching a state of the CPU to the second operation mode in response to starting one of an operating system or an application program based on a user operation in the state in which the first operation mode is set, and switching the state of the CPU to the first operation mode in response to a determination that a condition is met; and
reducing or stopping, in response to the CPU being in the second operation mode, a process of a predetermined application program that runs in a background.

14. The method of claim 13, further comprising detecting a use form, and to setting the state of the CPU to at least one of the first operation mode or the second operation mode in response to the detected use form.

15. The method of claim 14, further comprising, in response to the detected use form, switching the state of the CPU to the second operation mode, and subsequently in response to the determination that the condition is met, switch the state of the CPU to the first operation mode.

16. The method of claim 15, further comprising detecting the use form distinguished by a shape, as the use form in which an apparatus is used.

17. The method of claim 13, further comprising switching the state of the CPU to the first operation mode in response to a predetermined time having elapsed after setting the state of the CPU to the second operation mode.

18. The method of claim 17, further comprising setting the predetermined time depending on a type of the application program.

19. A program product comprising a non-transitory computer readable storage medium that stores code executable by a processor, the executable code comprising code to:
operate a central processing unit ("CPU") in one of at least a first operation mode and a second operation mode, where the second operation mode is a higher performance operation mode than the first operation mode;
switch a state of the CPU to the second operation mode in response to starting one of an operating system or an application program based on a user operation in the state in which the first operation mode is set, and switch the state of the CPU to the first operation mode in response to a determination that a condition is met; and
reduce or stop, in response to the CPU being in the second operation mode, a process of a predetermined application program that runs in a background.

* * * * *